(12) United States Patent
Ooga

(10) Patent No.: US 9,927,272 B2
(45) Date of Patent: Mar. 27, 2018

(54) AIR FLOW METER HAVING A FLOW RATE SENSOR AND A PHYSICAL QUANTITY SENSOR

(71) Applicant: DENSO CORPORATION, Kariya, Aichi-pref. (JP)

(72) Inventor: Takashi Ooga, Kariya (JP)

(73) Assignee: DENSO CORPORATION, Kariya (JP)

( * ) Notice: Subject to any disclaimer, the term of this patent is extended or adjusted under 35 U.S.C. 154(b) by 294 days.

(21) Appl. No.: 14/752,170

(22) Filed: Jun. 26, 2015

(65) Prior Publication Data

US 2015/0377671 A1  Dec. 31, 2015

(30) Foreign Application Priority Data

Jun. 27, 2014 (JP) .................. 2014-132897

(51) Int. Cl.
| | |
|---|---|
| G01F 5/00 | (2006.01) |
| G01F 1/684 | (2006.01) |
| G01F 1/692 | (2006.01) |
| G01F 15/12 | (2006.01) |

(52) U.S. Cl.
CPC ............ *G01F 1/692* (2013.01); *G01F 1/6842* (2013.01); *G01F 5/00* (2013.01); *G01F 15/12* (2013.01)

(58) Field of Classification Search
CPC ......... G01F 1/692; G01F 1/6842; G01F 15/12
USPC ....................................... 73/114.32
See application file for complete search history.

(56) References Cited

U.S. PATENT DOCUMENTS

| | | | | |
|---|---|---|---|---|
| 2005/0246124 | A1* | 11/2005 | Tomer | ................... H01L 22/26 702/117 |
| 2010/0031737 | A1 | 2/2010 | Saito et al. | |
| 2012/0079879 | A1 | 4/2012 | Saito et al. | |
| 2012/0085324 | A1 | 4/2012 | Saito et al. | |
| 2012/0103084 | A1* | 5/2012 | Ooga | ................... G01F 1/6842 73/204.25 |
| 2012/0198925 | A1* | 8/2012 | Saito | ................... F02D 41/187 73/114.33 |
| 2016/0139071 | A1 | 5/2016 | Nakano et al. | |

FOREIGN PATENT DOCUMENTS

JP   2010-151795   7/2010

* cited by examiner

*Primary Examiner* — Walter L Lindsay, Jr.
*Assistant Examiner* — Philip Marcus T Fadul
(74) *Attorney, Agent, or Firm* — Nixon & Vanderhye P.C.

(57) ABSTRACT

An air flow meter has a housing, a flow rate sensor, and a physical-quantity measuring sensor. The housing therein defines a bypass passage into which a part of air flowing in a duct flows. The flow rate sensor is disposed in the bypass passage. The physical-quantity measuring sensor measures a physical quantity of air flowing in the duct and is disposed separately from the flow rate sensor. The housing has a recessed portion that is recessed from an inner wall surface of the bypass passage and that has a blind-passage shape. The physical-quantity measuring sensor is disposed in the recessed portion.

8 Claims, 8 Drawing Sheets

AIR FLOW METER HAVING A FLOW RATE SENSOR AND A PHYSICAL QUANTITY SENSOR

CROSS REFERENCE TO RELATED APPLICATION

This application is based on Japanese Patent Application No. 2014-132897 filed on Jun. 27, 2014, the disclosure of which is incorporated herein by reference in its entirety.

TECHNICAL FIELD

The present disclosure relates to an air flow meter measuring a flow rate of intake air for an internal combustion engine.

BACKGROUND

Conventionally, an air flow meter capable of detecting humidity is known, and Patent Document 1 (JP 5178388 B2 corresponding to US 2010/0031737 A1 and US 2012/0079879 A1) describes such an air flow meter. An air flow meter described in Patent Document 1 has a flow rate sensor and a humidity sensor. The flow rate sensor is disposed in an auxiliary air passage into which a part of intake air flows. The humidity sensor is disposed in a secondary auxiliary air passage branched from the auxiliary air passage. The secondary auxiliary air passage has an inlet through which air flows from the auxiliary air passage into the secondary auxiliary air passage and an outlet from which the air returns to the auxiliary air passage from the secondary auxiliary air passage.

However, according to studies conducted by the inventor of the present disclosure, dust may be adhered easily to the humidity sensor that is disposed in the secondary auxiliary air passage since large amount of air flows in the secondary auxiliary air passage. That is, the air flow meter may be contaminated easily by dust, in other words, the air flow meter may have a low contamination resistance.

SUMMARY

The present disclosure addresses at least one of the above issues. Thus, it is an objective of the present disclosure to provide an air flow meter which has a physical-quantity measuring sensor separately from a flow rate sensor and with which an adhesion of dust to the physical-quantity measuring sensor can be suppressed.

An air flow meter has a housing, a flow rate sensor, and a physical-quantity measuring sensor. The housing therein defines a bypass passage into which a part of air flowing in a duct flows. The flow rate sensor is disposed in the bypass passage. The physical-quantity measuring sensor measures a physical quantity of air flowing in the duct and is disposed separately from the flow rate sensor. The housing has a recessed portion that is recessed from an inner wall surface of the bypass passage and that has a blind-passage shape. The physical-quantity measuring sensor is disposed in the recessed portion.

According to the above-described configuration, since less amount of air flows in the recessed portion, and the physical-quantity measuring sensor is disposed in the recessed portion, an adhesion of dust to the physical-quantity measuring sensor can be suppressed. That is, a contamination resistance of the physical-quantity measuring sensor can be improved in the air flow meter having the physical-quantity measuring sensor separately from the flow rate sensor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
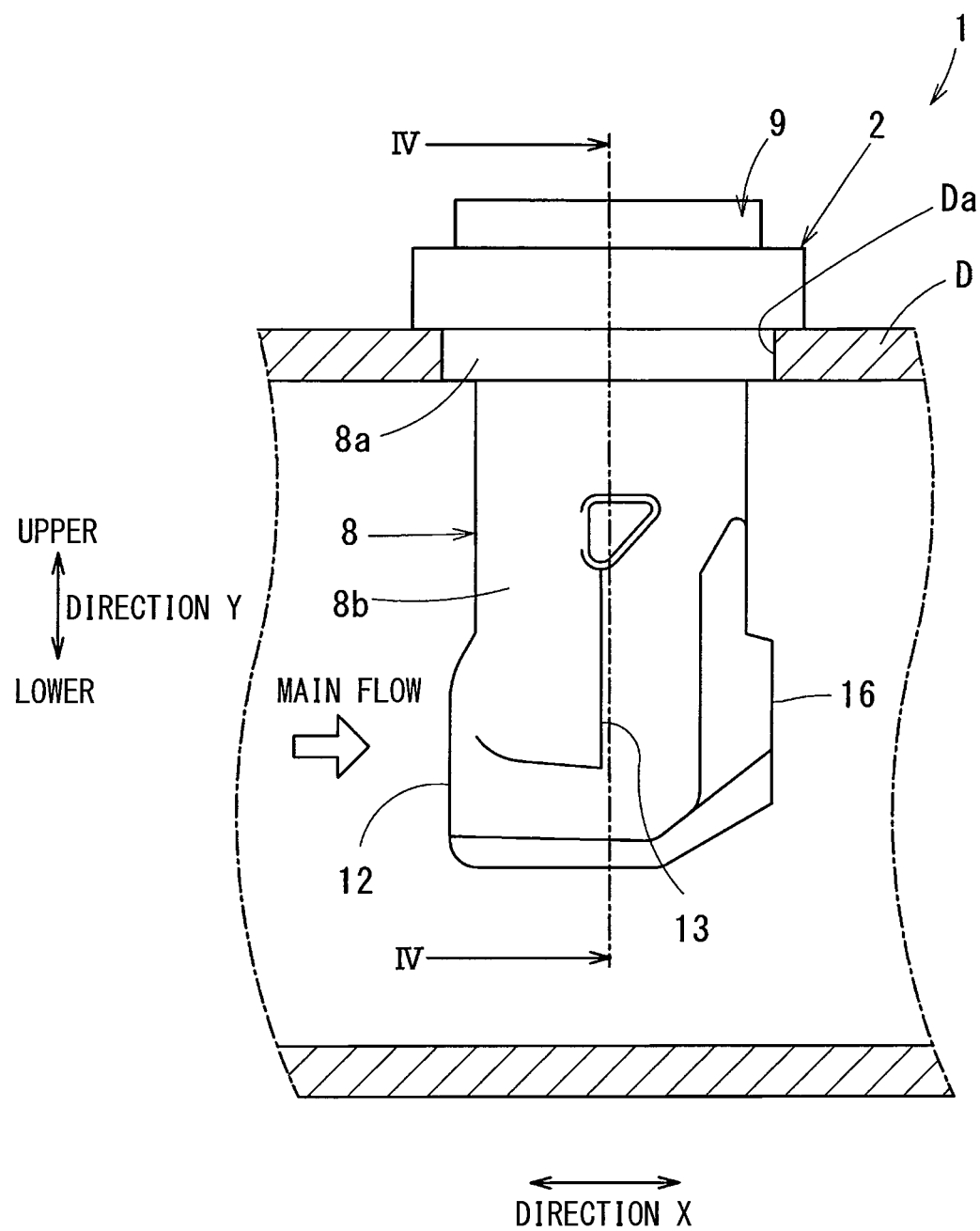
FIG. 1 is a diagram illustrating an air flow meter of a first embodiment.

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

An air flow meter 1 of a first embodiment will be described hereafter referring to FIGS. 1 to 4.

The air flow meter 1 may measure a flow rate of intake air for an internal combustion engine (i.e., an engine) for a vehicle. The air flow meter 1 is attached to a duct D that is connected to a downstream side of an air cleaner. The duct D has an attachment hole Da that has a circular shape in cross section and passes through a wall of the duct D in a thickness direction. The air flow meter 1 is inserted to an inside of the duct D from the attachment hole Da.

The air flow meter 1 has a housing 2, a flow rate sensor 3, and a humidity sensor 4. The humidity sensor 4 is a physical-quantity measuring sensor that is disposed separately from the flow rate sensor 3 and measures a physical quantity.

The housing 2 has a housing body 8 and a resin portion 9. The housing body 8 defines a bypass passage 7 to which a part of air flowing in the duct D flows to be a target air. The housing body 8 is molded in a primary molding step, and the resin portion 9 is molded in a secondary molding step.

The housing body 8 has a fitting portion 8a fitting to the attachment hole Da and a passage defining portion 8b extending from the fitting portion 8a to an inside of the duct D. As shown in FIG. 1, the fitting portion 8a has an outer surface facing a wall surface (i.e., an inner surface) defining the attachment hole Da in a radial direction of the fitting portion 8a. A clearance between the outer surface of the fitting portion 8a and the wall surface defining the attachment hole Da is sealed completely (i.e., gastightly).

The passage defining portion 8b extends from the fitting portion 8a into the duct D and defines the bypass passage 7 into which a part of air flowing in the duct D flows to be the target air.

Hereafter, a flow direction of air flowing in the duct D will be referred to as a main flow direction. The main flow direction is parallel with a direction in which the duct D extends and is also parallel with a direction X shown in FIG. 1. A direction in which the housing body 8 extends will be referred to as a direction Y (i.e., an upper-lower direction). In a state of showing in FIG. 1, the passage defining portion 8b extends from the fitting portion 8a toward a lower side in the direction Y, and an opposite side that is opposite to the lower side in the direction Y will be referred to as an upper side. A direction perpendicular to both the direction X and the direction Y will be referred to as a direction Z.

Figure 2:
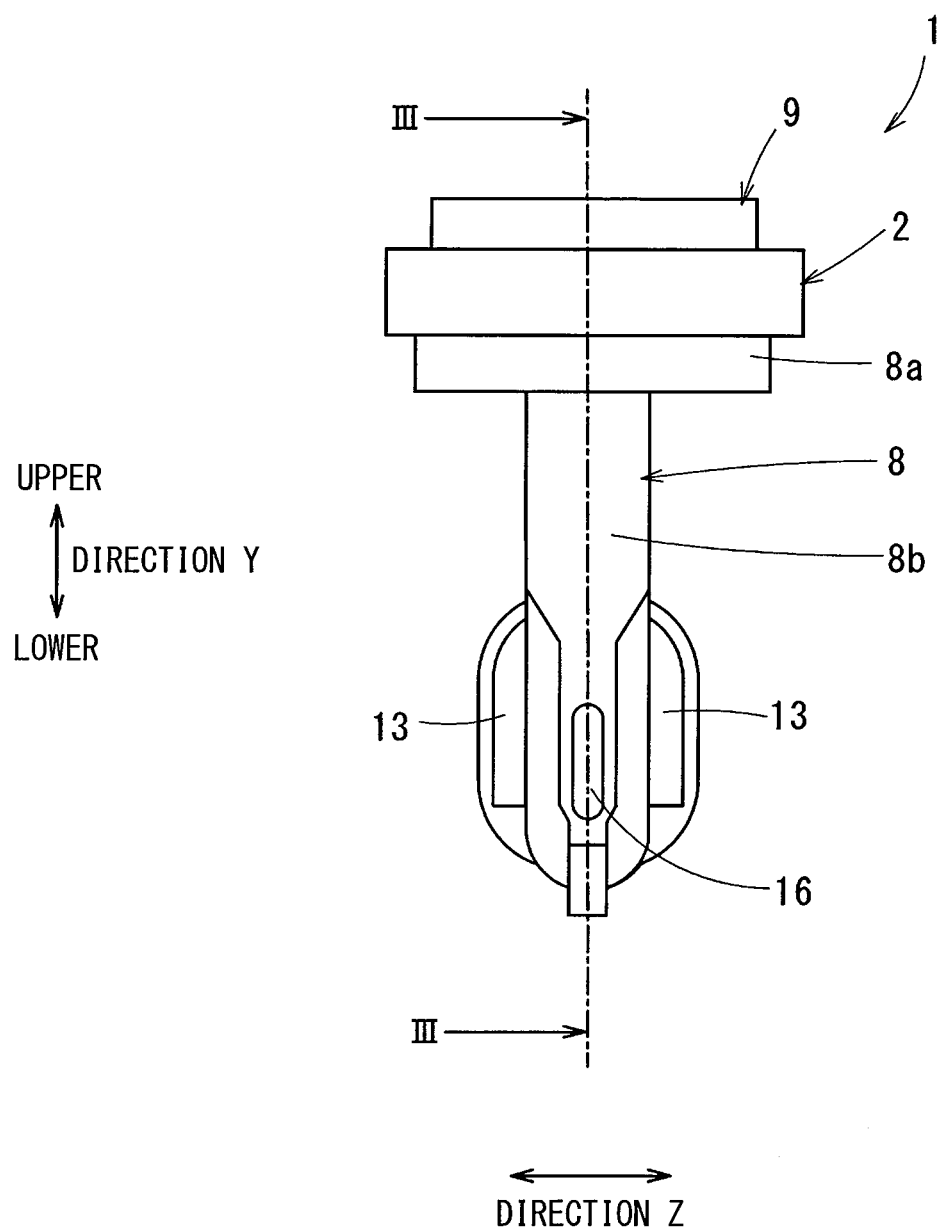
FIG. 2 is a plane view illustrating the air flow meter when viewed from an upstream side in a main flow direction of the first embodiment.

A constitution of the bypass passage 7 will be described referring to FIG. 3. The bypass passage 7 has an intake port 12 opening toward an upstream side in the main flow direction and an emitting port 13 opening toward a downstream side in the main flow direction. For example, the bypass passage 7 guides air (i.e., intake air) flowing into the bypass passage 7 from the intake port 12 to circulate, and the air flows out of the bypass passage 7 from the emitting port 13. The bypass passage 7 has an area 14 (illustrated as a straight portion of the bypass passage 7) in which fluid (i.e., air) flows in a direction that is opposite to the main flow direction, and the flow rate sensor 3 is disposed in the area 14. The bypass passage 7 is branched into two passages on a downstream side of the flow rate sensor 3, and each of the two passages has the emitting port 13 in both side surfaces of the housing 2 in the direction Z as shown in FIG. 2.

The bypass passage 7 is connected with a dust emitting passage 15 on an upstream side of the flow rate sensor 3, and the dust emitting passage 15 emits dust. Specifically, dust flowing into the bypass passage 7 is emitted from a dust emitting outlet 16 of the dust emitting passage 15 to return to the duct D without flowing to the flow rate sensor 3 as shown in FIG. 3.

The flow rate sensor 3 outputs an electric signal such as a pressure signal based on a flow rate of air flowing in the bypass passage 7. Specifically, the flow rate sensor 3 has a semiconductor board having a membrane, and a heat generating element and a thermal sensitive element that are made of thin-film resistive element are disposed on the membrane.

The flow rate sensor 3 is modularized with a circuit module 20, an external terminal (i.e., a terminal) 21, and the like to constitute a sensor assembly 23. In an assembly of the sensor assembly 23, the circuit module 20 and the external terminal 21 are assembled in the sensor assembly 23 by insert molding.

The circuit module 20 processes the electrical signal from the flow rate sensor 3 and therein has a circuit board (not shown). The external terminal 21 is a terminal that outputs an electrical signal processed in the circuit module 20 to an electric control unit (i.e., an ECU) (not shown) through a connector (not shown).

The sensor assembly 23 is inserted and fixed in the housing body 8 such that a sensing portion of the flow rate sensor 3 is exposed in the area 14 of the bypass passage 7.

Figure 3:
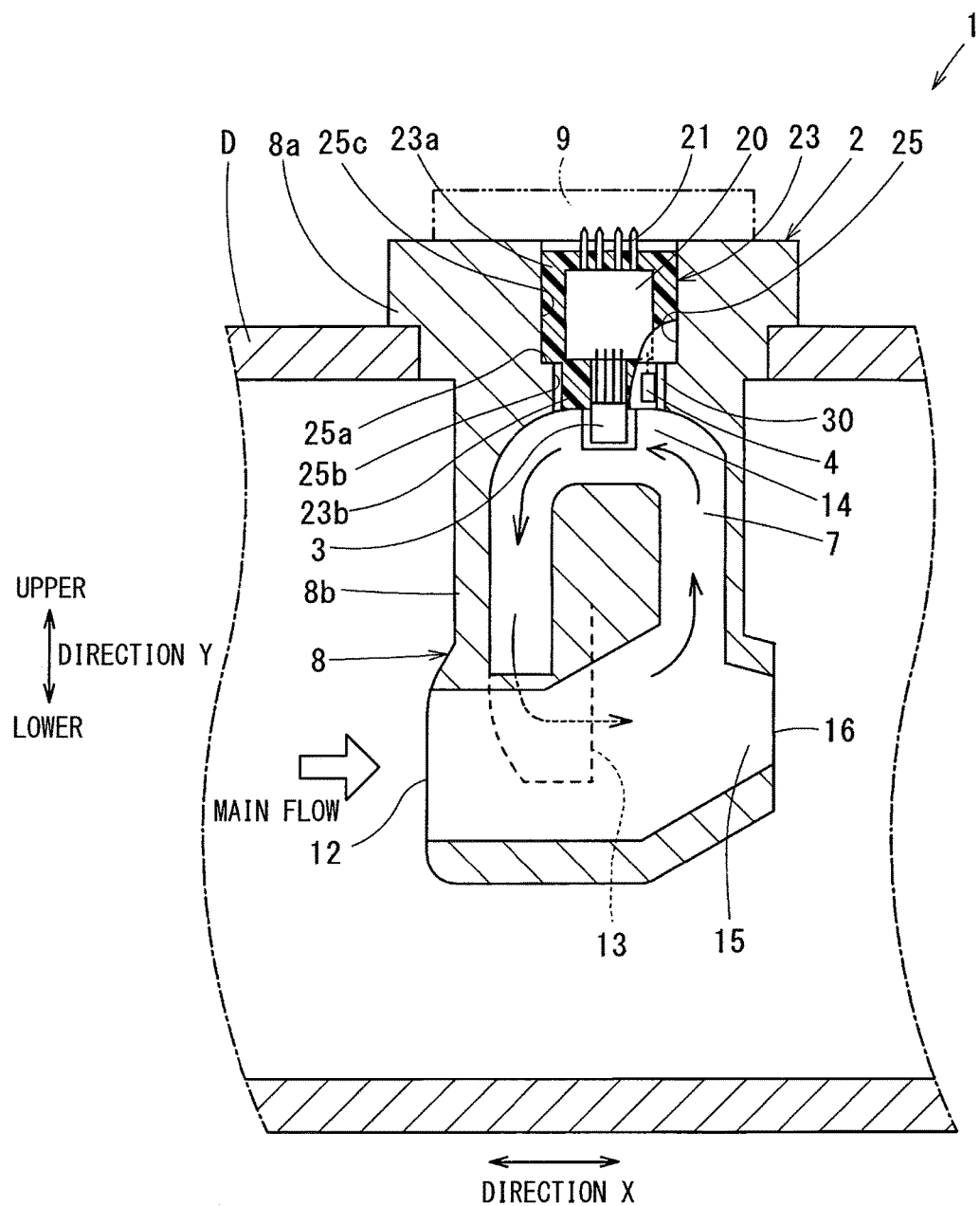
FIG. 3 is a sectional view taken along a line III-III shown in FIG. 2.
Figure 4:
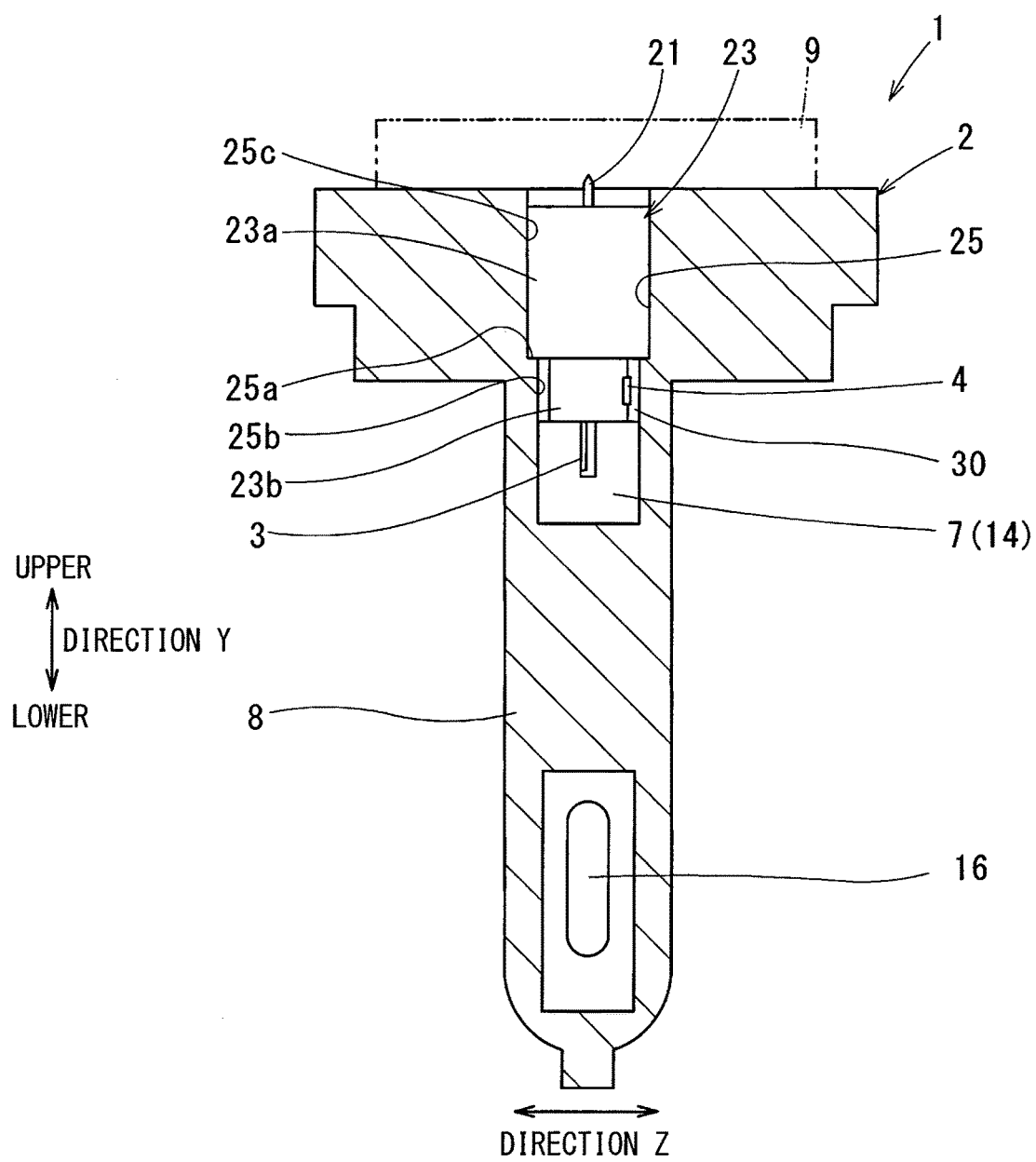
FIG. 4 is a sectional view taken along a line IV-IV shown in FIG. 1.

Specifically, the housing body 8 has an insert hole 25 that is a housing space housing the sensor assembly 23, and the sensor assembly 23 is inserted to the insert hole 25 such that the flow rate sensor 3 is exposed in the bypass passage 7 as shown in FIG. 3.

The insert hole 25 passes through the housing body 8. The insert hole 25 is a stepped hole, in other words, the insert hole 25 has different dimensions in the direction Z and in the direction X. Specifically, a dimension of the insert hole 25 in the direction Z and in the direction X is changed at a step surface 25a. A dimension of the insert hole 25 in the direction Z and in the direction X on a lower side of the step surface 25a in the direction Y is smaller than that on an upper side of the step surface 25a in the direction Y. That is, as shown in FIG. 3, the insert hole 25 has a lower hole portion 25b that is located on the lower side of the step surface 25a in the direction Y and an upper hole portion 25c that is located on the upper side of the step surface 25a in the direction Y. The dimension of the lower hole portion 25b in the direction Z and in the direction X is smaller than the dimension of the upper hole portion 25c in the direction Z and in the direction X. The lower hole portion 25b is open toward the bypass passage 7.

The sensor assembly 23 has a large diameter portion 23a and a small diameter portion 23b. The large diameter portion 23a is larger than the small diameter portion 23b in dimension in the direction Z and in the direction X. The large diameter portion 23a is disposed in the upper hole portion 25c and fits to the step surface 25a in the direction Y. The small diameter portion 23b is disposed in the lower hole portion 25b on a lower side of the large diameter portion 23a in the direction Y. The flow rate sensor 3 is disposed on a lower side of the small diameter portion 23b in the direction Y to be exposed in the bypass passage 7.

The resin portion 9 is molded on a condition where the sensor assembly 23 is located in the housing body 8.

The humidity sensor 4 outputs an electric signal such as a voltage signal based on a detected humidity of air flowing in the duct D. The humidity sensor 4 uses, for example, a variation of permittivity of a polymer membrane that is caused by a variation of relative humidity.

The housing 2 has a recessed portion 30 recessed from an inner wall surface of the bypass passage 7. The recessed portion 30 has a blind-passage shape, in other words, one end of the recessed portion 30 in the direction Y is open, and the other end of the recessed portion 30 in the direction Y is closed. The humidity sensor 4 is disposed in the recessed portion 30. The housing 2 has the insert hole 25 that houses the sensor assembly 23 such that the flow rate sensor 3 is exposed in the bypass passage 7, and a part of the insert hole 25 defines the recessed portion 30.

That is, in the present embodiment, the recessed portion 30 is defined by the lower hole portion 25b in which the small diameter portion 23b is disposed. A clearance is defined between an inner surface of the lower hole portion 25b and an outer surface of the small diameter portion 23b in a radial direction of the insert hole 25. The clearance is open to the bypass passage 7 on a lower side in the direction Y and is closed by the large diameter portion 23a on an upper side in the direction Y. As a result, the clearance has a blind-passage shape, in other words, one end of the clearance in the direction Y is open, and the other end of the clearance in the direction Y is closed. Thus, the clearance defines the recessed portion 30.

The humidity sensor 4 is disposed in the recessed portion 30.

In the present embodiment, the humidity sensor 4 is disposed, for example, to be exposed on a surface of the small diameter portion 23b. The humidity sensor 4 is connected to the circuit board that is included in the circuit module 20 and is connected to the flow rate sensor 3. The humidity sensor 4 is assembled to the sensor assembly 23 together with the flow rate sensor 3.

Since air flowing in the bypass passage 7 flows into the recessed portion 30, a humidity of air flowing in the bypass passage 7, in other words, a humidity of air flowing in the duct D, can be determined by disposing the humidity sensor 4 in the recessed portion 30.

Since the recessed portion 30 has the blind-passage shape, air flows in the recessed portion 30 less strongly, and an adhesion of dust to the humidity sensor 4 can be suppressed. That is, a contamination resistance of a physical-quantity measuring sensor (e.g., the humidity sensor 4) can be improved in the air flow meter 1 having the physical-quantity measuring sensor separately from the flow rate sensor 3.

Although the physical-quantity measuring sensor is the humidity sensor 4 in the present embodiment, the physical-quantity measuring sensor may be another sensor such as a temperature sensor and a pressure sensor.

In the present embodiment, the humidity sensor 4 is integrally assembled in the sensor assembly 23 having the flow rate sensor 3. Accordingly, cost can be reduced, and reliability can be improved.

Second Embodiment

Figure 5:
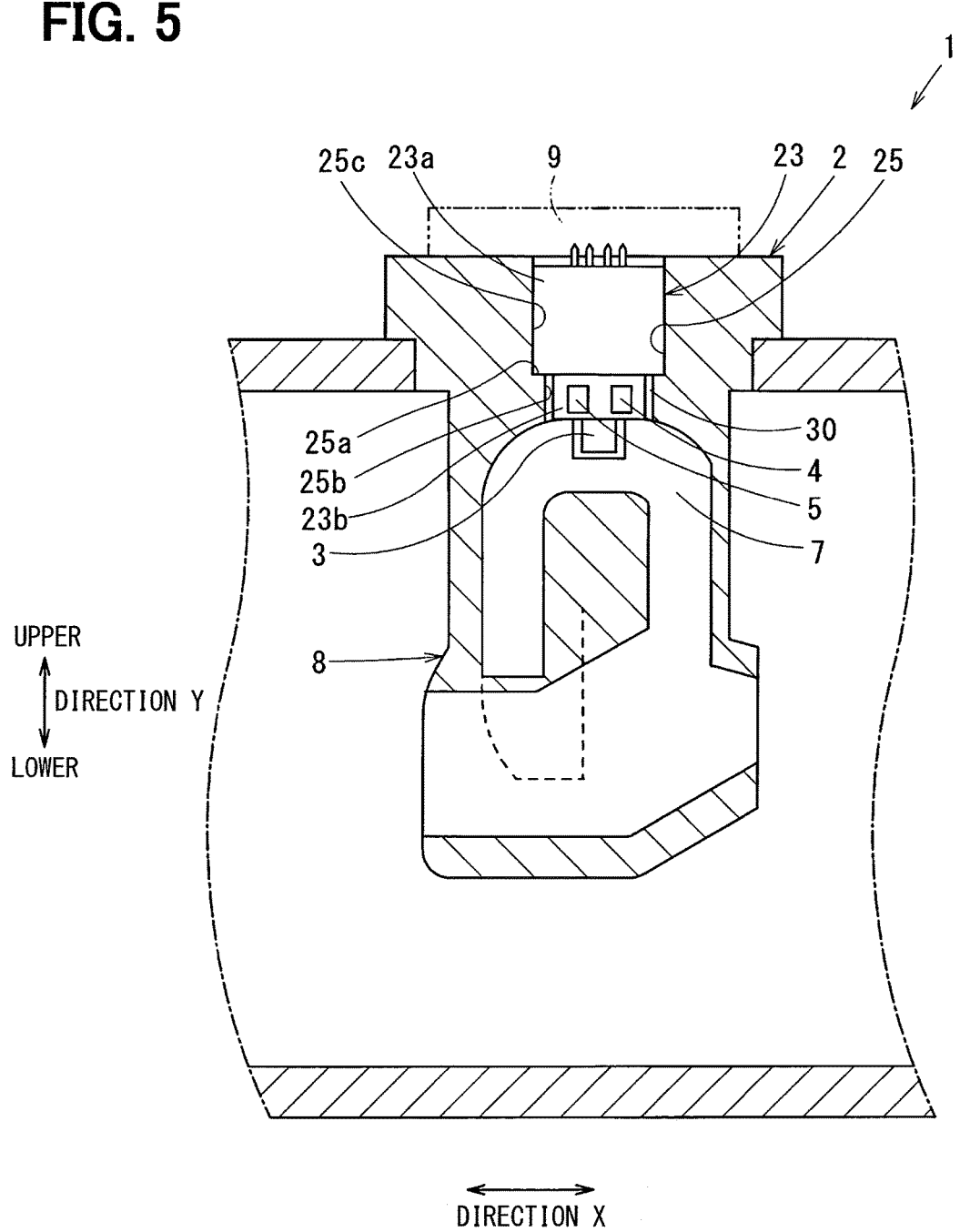
FIG. 5 is a partial sectional view illustrating an air flow meter of a second embodiment.

An air flow meter 1 of a second embodiment will be described hereafter referring to FIG. 5. In the second embodiment, features that are different from the first embodiment will be described mainly.

The air flow meter 1 of the second embodiment has physical-quantity measuring sensors separately from the flow rate sensor 3. For example, the physical-quantity measuring sensors includes a pressure sensor 5 in addition to the humidity sensor 4 as compared to the first embodiment. Similar to the humidity sensor 4, the pressure sensor 5 is assembled in the sensor assembly 23 to be exposed on the surface of the small diameter portion 23b.

The present embodiment can produce the same effects as the first embodiment.

Third Embodiment

Figure 6:
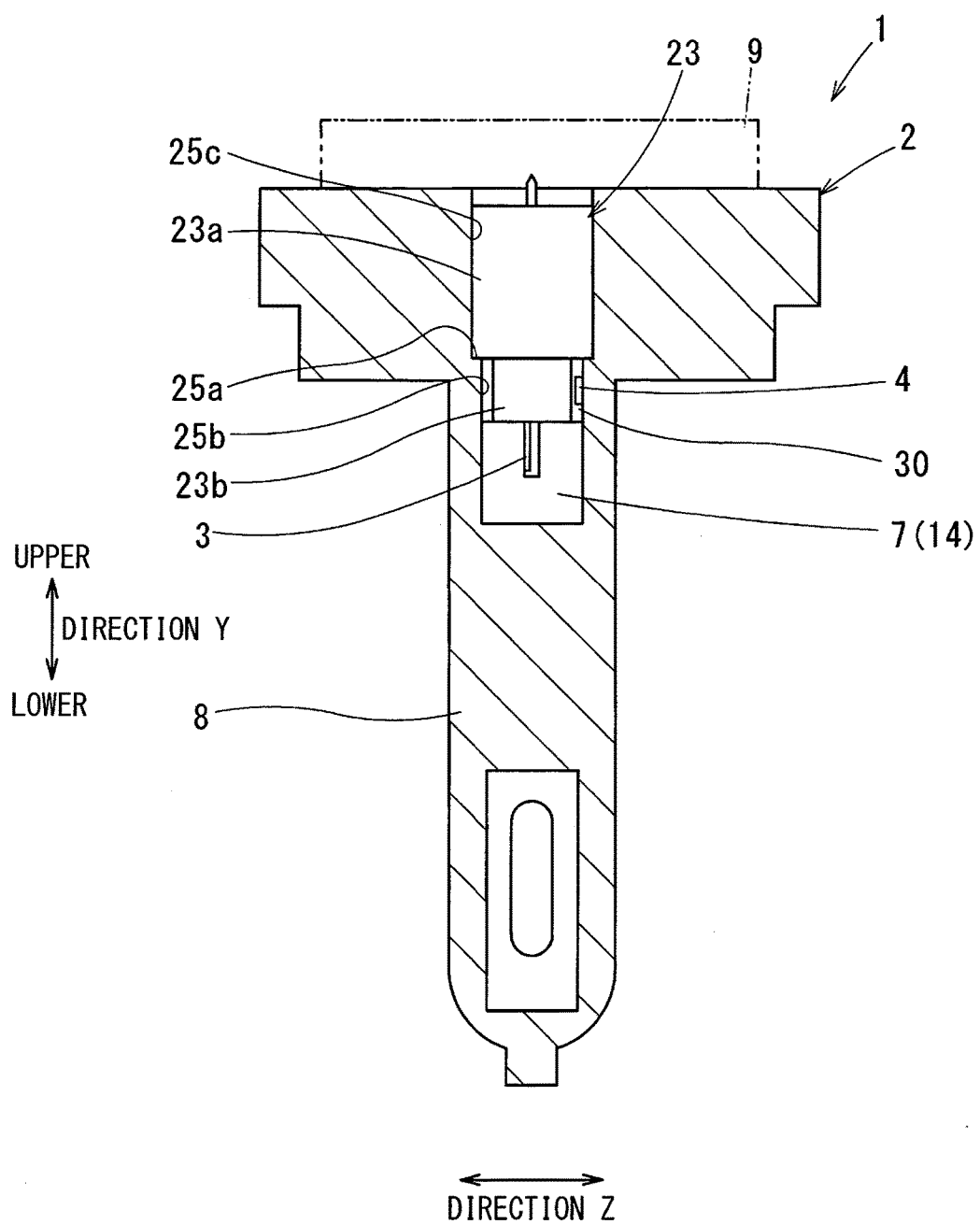
FIG. 6 is a partial sectional view illustrating an air flow meter of a third embodiment.

An air flow meter 1 of a third embodiment will be described hereafter referring to FIG. 6. In the third embodiment, features that are different from the first embodiment will be described mainly.

In the third embodiment, the humidity sensor 4 is not assembled in the sensor assembly 23 and is disposed independently from the sensor assembly 23. That is, the humidity sensor 4 is connected to a circuit board that is different from the circuit board to which the flow rate sensor 3 is connected. For example, the humidity sensor 4 is disposed in an inner surface of the lower hole portion 25b and is connected to the circuit board that is different from the circuit board for the flow rate sensor 3.

The present embodiment can produce the same effects as the first embodiment.

Other Modification

Figure 7:
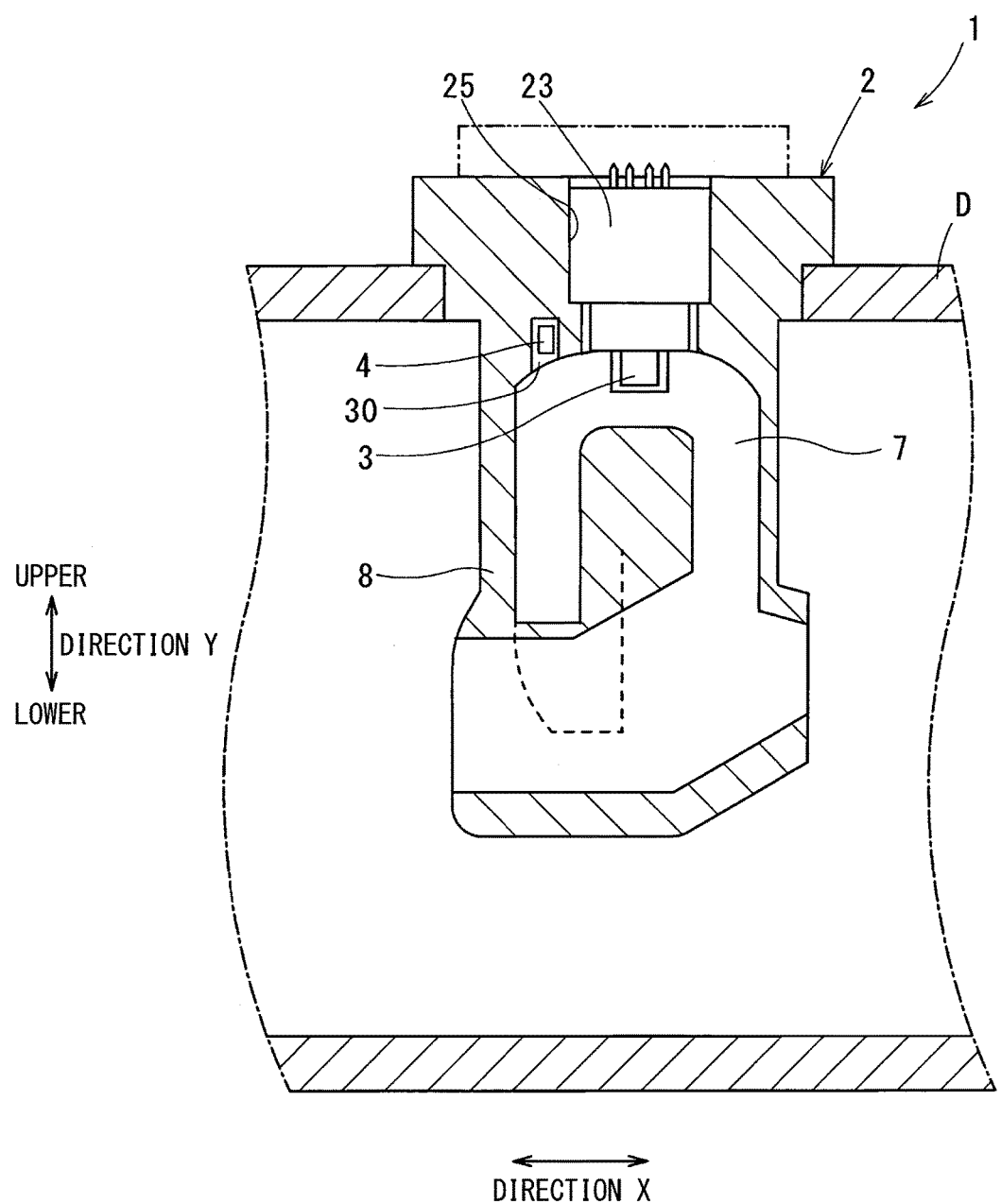
FIG. 7 is a partial sectional view illustrating an air flow meter of a modification.

In the above-described embodiments, the part of the insert hole 25 defines the recessed portion 30. However, as shown in FIG. 7, the recessed portion 30 may be defined to be recessed from the inner wall surface of the bypass passage 7 at a location distanced from the insert hole 25. In this case, the physical-quantity measuring sensor (i.e., the humidity sensor 4) is disposed in the recessed portion 30 separately from the flow rate sensor 3.

Figure 8:
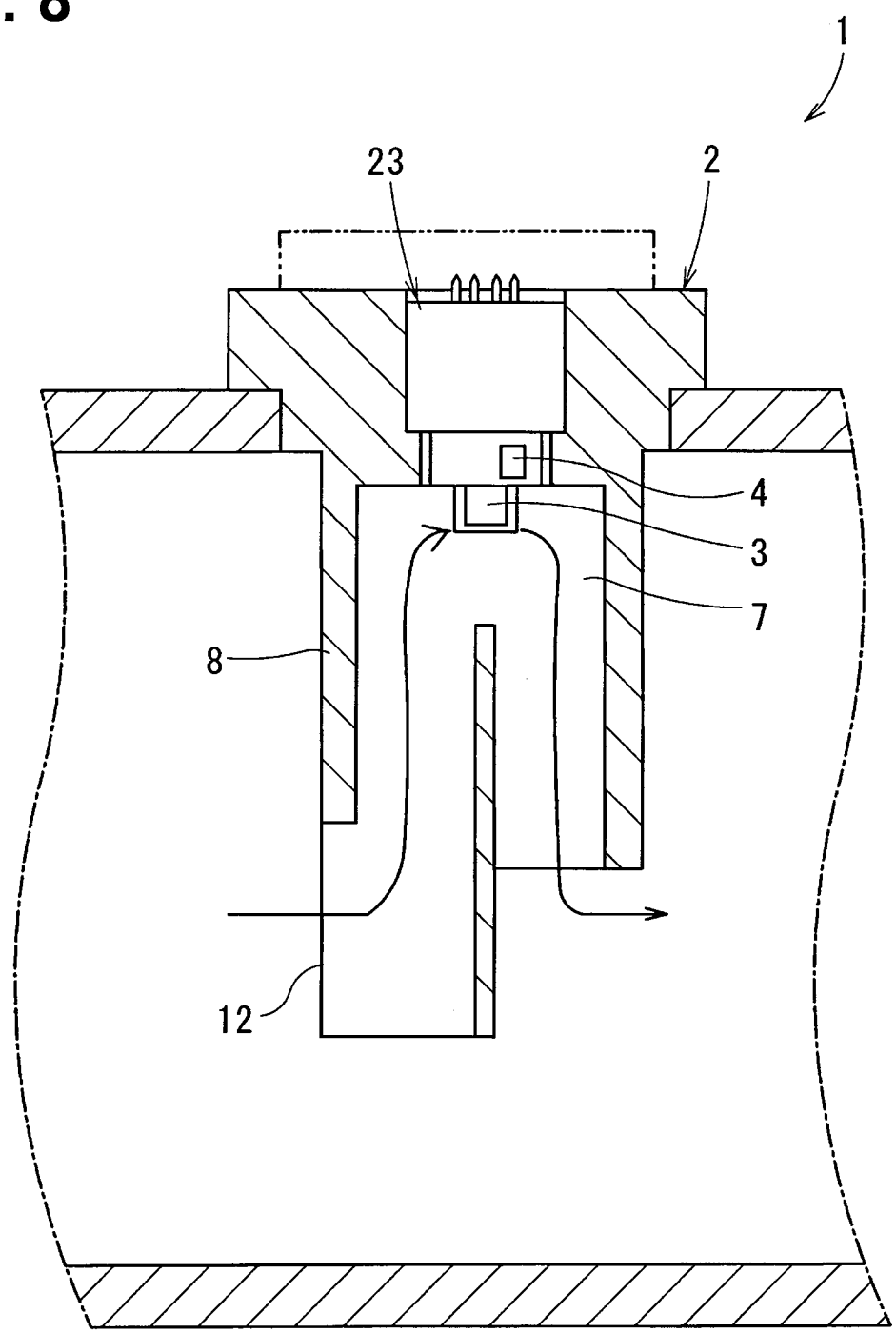
FIG. 8 is a partial sectional view illustrating an air flow meter of a modification.

In the above-described embodiments, the bypass passage 7 guides intake air from the intake port 12 to flow to the emitting port 13 after circulating along the bypass passage 7. Further, the bypass passage 7 has the area 14 in which fluid (i.e., air) flows in a direction that is opposite to the main flow direction. However, the bypass passage 7 is not limited to guide a part of main flow to flow into the bypass passage 7 and to circulate along the bypass passage 7. The bypass passage 7 may guide air flowing from the intake port 12 to flow in the bypass passage 7 in the main flow direction and to emits the air in the main flow direction as shown in FIG. 8.

Such changes and modifications are to be understood as being within the scope of the present disclosure as defined by the appended claims.

What is claimed is:

1. An air flow meter comprising:
a housing;
a passage defined in the housing and configured so that a part of air flowing in a duct in a main flow direction flows into the passage,
a flow rate sensor disposed in the housing; and
a physical-quantity measuring sensor configured to measure a physical quantity of air flowing in the duct and disposed separately from the flow rate sensor, wherein
the passage has a straight portion with a surface that extends parallel to the main flow direction,
the housing has a recessed portion communicating with the straight portion of the passage only through a single communication opening,
the single communication opening is through the surface,
the recessed portion is a blind-passage that is recessed in a direction perpendicular to a flow direction of the air flowing in the straight portion, and
the physical-quantity measuring sensor is disposed in the recessed portion to be out of alignment with the straight portion.

2. The air flow meter according to claim 1, wherein
the flow rate sensor, a circuit board that is connected with the flow rate sensor, and a terminal that connects an external device to the circuit board are modularized to constitute a sensor assembly,
the housing defines a housing space housing the sensor assembly such that the flow rate sensor is exposed in the passage, and
the recessed portion is defined by a part of the housing space.

3. The air flow meter according to claim 1, wherein
the physical-quantity measuring sensor is connected to a circuit board to which the flow rate sensor is connected, and
the physical-quantity measuring sensor is modularized with the flow rate sensor.

4. The air flow meter according to claim 1, wherein
the physical-quantity measuring sensor is not assembled in the the flow rate sensor and is disposed independently from the flow rate sensor.

5. The air flow meter according to claim 1, wherein
the physical-quantity measuring sensor is one of a plurality of physical-quantity measuring sensors.

6. The air flow meter according to claim 1, wherein the flow direction of air flowing in the straight portion is opposite to the main flow direction.

7. The air flow meter according to claim 1, further comprising
a main passage in the housing, located in the duct and that extends parallel to the main flow direction,
wherein the main passage is configured so that the part of the air flowing in the duct flows into the main passage, and
wherein the passage is branched from the main passage.

8. The air flow meter according to claim 7, wherein the main passage has
an inlet that is open to the passage in the direction perpendicular to the main flow direction, and
an outlet that is open to the duct in the main flow direction,
the passage is branched from the main passage in the inlet, and
air flowing into the passage from the inlet passes through the straight portion and flows out of the passage directly into the duct.

* * * * *